(No Model.)

H. KÖCHERT.
HORSESHOE.

No. 553,168. Patented Jan. 14, 1896.

Witnesses.
Emil Savor
Carl Bülow

Inventor
Hugo Köchert
by Hopkins Hentz.
Attorneys.

UNITED STATES PATENT OFFICE.

HUGO KÖCHERT, OF VIENNA, AUSTRIA-HUNGARY.

HORSESHOE.

SPECIFICATION forming part of Letters Patent No. 553,168, dated January 14, 1896.

Application filed May 16, 1894. Serial No. 511,446. (No model.)

*To all whom it may concern:*

Be it known that I, HUGO KÖCHERT, a subject of the Emperor of Austria-Hungary, and a resident of Vienna, in the Austrian Empire, have invented certain new and useful Improvements in Horseshoes, of which the following is a full, clear, and exact description.

The present invention consists of a horseshoe comprising an upper flange having the configuration of an ordinary horseshoe and attached to the hoof in the usual manner, and a downwardly-projecting flange extending entirely or partially around the outer rim of the said horizontal flange, the whole forming an angle-iron bent to the shape of a horseshoe. Within this said angle-frame is attached in suitable manner a pad or layer of felt, leather, caoutchouc, or woven fabric or straw matting.

In order to make the present specification more easily intelligible, reference is had to the accompanying drawings, in which similar letters denote similar parts throughout the several views.

Figure 1:
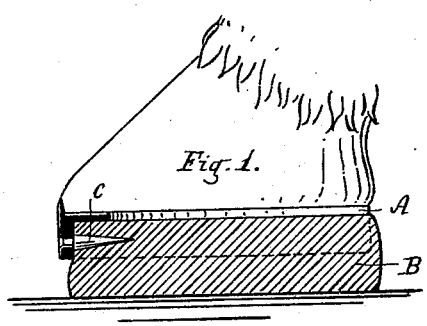
Figure 2:
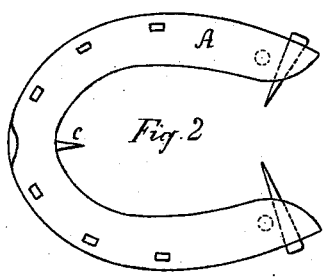
Figure 3:
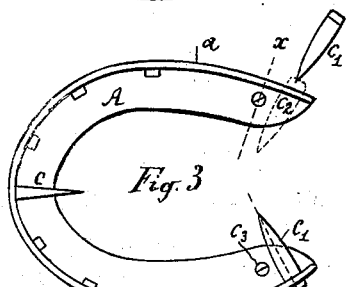
Figure 4:
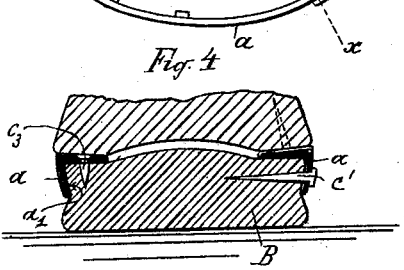
Figure 5:
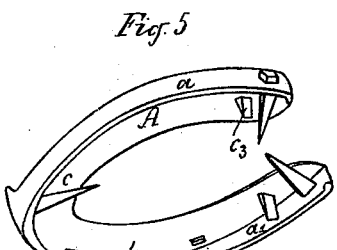
Figure 6:
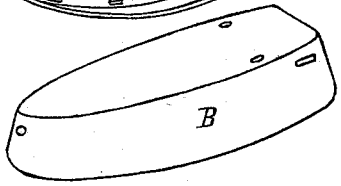
Figure 7:
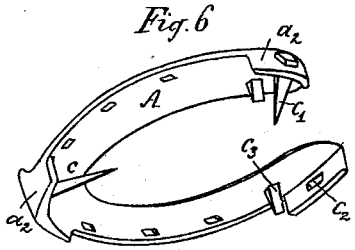
Figure 8:
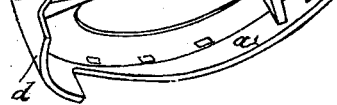

Figure 1 illustrates a central section through the shoe and pad as applied to the hoof. Fig. 2 is a plan of Fig. 1. Fig. 3 is a plan of the angle-frame seen from underneath. Fig. 4 is a section on the line $x\ x$, Fig. 3. Fig. 5 is a perspective view of the frame with retaining-spikes for the pad and of the pad detached. Fig. 6 shows a perspective view of the upper flange having a mutilated vertical flange. Fig. 7 is a perspective view showing a shoe-frame constructed according to the present invention and having a front calk, and Fig. 8 shows details of spikes employed to secure the said pad.

Referring to Figs. 1 to 4, A is the horizontal flange of the angle-iron bent to the ordinary horseshoe shape and secured to the hoof in the usual manner. $a$ is the vertical flange or web extending entirely or partly, Fig. 6, around the outer rim of the said horizontal flange and being bent slightly inward, as at $a'$, Fig. 4, all around in order to properly grip the pad B. B is the pad placed within the angle-frame A $a$, and consisting of felt, leather, rubber pulp, fabric, straw matting, or the like, said pad being retained in position by means of spikes $c$ fixed in and extending horizontally inwardly from the flange $a$ at the toe end of the frame and by the nails or splints $c'$ adapted to be inserted through the said flange $a$ at the orifices $c^2$ of the same at the ends of the said shoe. In addition to these horizontally-extending spikes the pad may be further secured by means of spikes $c^3$ extending vertically downward from the horizontal flange A of the frame, Figs. 3, 4, 5, 6 and 7. Instead of a complete angle-frame, as shown at Figs. 2 to 5, a mutilated frame, Fig. 6, may be employed in which the horizontal flange is only provided with downwardly-extending lugs or a mutilated flange $a^2$ instead of a complete flange. Fig. 7 illustrates the manner in which shoes constructed according to the present invention may be provided with calks or tips $d$, in which case the flange $a$ is simply provided with a downwardly-projecting lug $d$.

The advantages of shoes constructed according to the present invention are, first, that the pad covers the sole of the hoof and gives the horse the same bearing-surface as the natural hoof instead of the rim only, as with shoes of the ordinary construction; second, by increasing the bearing-surface of the hoof the slipping and falling of the horse is hindered, and the pulling-power of the horse greatly increased; third, the hoof being entirely covered is protected from injury, and, finally, the concussion of the hoof on hard pavement is lessened and the horse enabled to traverse such pavings noiselessly. The pad can be easily taken out when worn and replaced by a new one, without the necessity of the horse being reshod.

In order to protect the hoof against dampness, the pad may be advantageously impregnated in any of the well-known ways.

I claim as my invention—

1. The combination of a frame A, having downwardly extending flange $a$, a pad B arranged within said flange, and spikes $c$, $c'$ extending horizontally inwardly from said flange as also downwardly from the frame A, substantially as described.

2. In a horseshoe, the combination of a frame A, having downwardly extending mutilated flange $a^2$, horizontally extending spikes $c$, $c'$, and vertically extending spikes $c^3$, with a pad B, arranged substantially as described.

In witness whereof I have hereunto set my hand in presence of two witnesses.

HUGO KOCHERT.

Witnesses:
VICTOR SNOWSKY, Jr.,
T. BELMONT.